United States Patent
Takami et al.

(10) Patent No.: US 10,591,105 B2
(45) Date of Patent: Mar. 17, 2020

(54) FLUID HANDLING DEVICE FOR LIQUID HYDROGEN

(71) Applicants: TOKYO BOEKI ENGINEERING LTD., Tokyo (JP); KAWASAKI HEAVY INDUSTRIES, LTD., Kobe-shi, Hyogo (JP)

(72) Inventors: Masashi Takami, Nagaoka (JP); Tomonori Takase, Akashi (JP); Shuntaro Unno, Akashi (JP)

(73) Assignees: TOKYO BOEKI ENGINEERING LTD, Chuo-ku, Tokyo (JP); KAWASAKI HEAVY INDUSTRIES, LTD, Kobe-shi, Hyogo (JP)

( * ) Notice: Subject to any disclaimer, the term of this patent is extended or adjusted under 35 U.S.C. 154(b) by 62 days.

(21) Appl. No.: 15/738,452

(22) PCT Filed: Jul. 7, 2016

(86) PCT No.: PCT/JP2016/070172
§ 371 (c)(1),
(2) Date: Dec. 20, 2017

(87) PCT Pub. No.: WO2017/010405
PCT Pub. Date: Jan. 19, 2017

(65) Prior Publication Data
US 2018/0187821 A1      Jul. 5, 2018

(30) Foreign Application Priority Data
Jul. 10, 2015   (JP) .................................. 2015-139136

(51) Int. Cl.
*F16L 59/18*   (2006.01)
*F16L 59/08*   (2006.01)
(Continued)

(52) U.S. Cl.
CPC ............. *F16L 59/075* (2013.01); *B67D 7/002* (2013.01); *B67D 7/04* (2013.01); *B67D 9/02* (2013.01);
(Continued)

(58) Field of Classification Search
CPC ....... F17D 1/082; F25J 2290/60; F16L 27/00; F16L 27/023; F16L 27/08; F16L 39/00;
(Continued)

(56) References Cited

U.S. PATENT DOCUMENTS 3,399,691 A * 9/1968 Schoch ................. F16L 59/141
137/375
3,674,355 A * 7/1972 Yearout ................... F16C 27/02
384/110
(Continued)

FOREIGN PATENT DOCUMENTS

DE        2164 823 A1    6/1973
EP      0 709 616 A1    5/1996
(Continued)

OTHER PUBLICATIONS

International Search Report for PCT/JP2016/070172 dated Sep. 20, 2016 [PCT/ISA/210].
(Continued)

*Primary Examiner* — Frantz F Jules
*Assistant Examiner* — Erik Mendoza-Wilkenfel
(74) *Attorney, Agent, or Firm* — Sughrue Mion, PLLC (57) ABSTRACT

An object is to propose a fluid handling device for liquid hydrogen that prevents evaporation of liquid hydrogen, and moreover affords excellent heat insulation without liquefying oxygen in the vicinity. In a fluid handling device for liquid hydrogen, piping sections (1) have a heat insulation structure, a swivel joint section (2) is configured with helium gas sealed into a boundary relative-rotation section (6)

(Continued)

between an outer ring section (3) and an inner ring section (4) with a bearing section (5) interposed, and moreover, between an outside-air-contacting wall section (7) that is in contact with the outside air and a liquid-hydrogen-contacting wall section (8) that is in contact with liquid hydrogen, a vacuum section (9) extends in the axial direction and moreover a heat-conducting extended path section (10) is provided with one end connected to the outside-air-contacting wall section (7) and the other end connected to the liquid-hydrogen-contacting wall section (8), extending the heat conduction distance between the outside-air-contacting wall section (7) and the liquid-hydrogen-contacting wall section (8), and reducing heat conductivity between the outside-air-contacting wall section (7) and the liquid-hydrogen-contacting wall section (8).

5 Claims, 5 Drawing Sheets (51) Int. Cl.
  *B67D 9/02* (2010.01)
  *H02K 9/00* (2006.01)
  *B67D 7/04* (2010.01)
  *F16L 59/075* (2006.01)
  *F16L 59/065* (2006.01)
  *F16L 27/08* (2006.01)
  *B67D 7/00* (2010.01)
  *F16L 59/14* (2006.01)
  *C01B 3/00* (2006.01)

(52) U.S. Cl.
  CPC ......... *F16L 27/0828* (2013.01); *F16L 59/065* (2013.01); *F16L 59/141* (2013.01); *F16L 59/185* (2013.01); *C01B 3/00* (2013.01); *Y02E 60/324* (2013.01); *Y02P 20/149* (2015.11)

(58) Field of Classification Search
  CPC ......... F16L 39/005; F16L 39/04; F16L 39/06; F16L 59/06; F16L 59/18; F16L 59/185; F16L 27/0828; H02K 9/00; B67D 7/04; B67D 9/02
  See application file for complete search history.

(56) References Cited

U.S. PATENT DOCUMENTS

| | | | |
|---|---|---|---|
| 3,884,511 A | 5/1975 | Hermanson | |
| 4,215,327 A * | 7/1980 | McCrea | H01P 1/042 333/12 |
| 4,998,560 A * | 3/1991 | Le Devehat | B67D 7/3218 137/615 |
| 6,134,893 A * | 10/2000 | Bonn | F16L 27/0828 62/50.7 |
| 6,623,043 B1 * | 9/2003 | Pollack | B63B 27/24 285/121.2 |
| 7,052,047 B1 | 5/2006 | Box et al. | |
| 2009/0261830 A1 * | 10/2009 | Mann | G01R 33/3804 324/318 |
| 2012/0187675 A1 * | 7/2012 | Tausch | F16J 15/025 285/272 |
| 2013/0240683 A1 * | 9/2013 | Fusy | F16L 3/20 248/70 |
| 2014/0230456 A1 * | 8/2014 | Tajima | F25B 9/14 62/6 |
| 2016/0304168 A1 * | 10/2016 | Fusy | B63B 27/24 |

FOREIGN PATENT DOCUMENTS

| | | |
|---|---|---|
| JP | 48-040072 U1 | 5/1973 |
| JP | 49-052317 A | 6/1973 |
| JP | 60-091889 U | 6/1985 |
| JP | 03-089099 A | 4/1991 |
| JP | 07-208684 A | 8/1995 |
| JP | 10-231970 A | 9/1998 |
| JP | 2001-289384 A | 10/2001 |
| JP | 2015-048186 A | 3/2015 |

OTHER PUBLICATIONS

Written Opinion for PCT/JP2016/070172 dated Sep. 20, 2016 [PCT/ISA/237].
Extended European Search Report dated Feb. 12, 2019 for EP Patent Appl. No. 16824385.5.

* cited by examiner

FLUID HANDLING DEVICE FOR LIQUID HYDROGEN

CROSS REFERENCE TO RELATED APPLICATIONS

This application is a National Stage of International Application No. PCT/JP2016/070172 filed Jul. 7, 2016, claiming priority based on Japanese Patent Application No. 2015-139136 filed Jul. 10, 2015, the contents of all of which are incorporated herein by reference in their entirety.

TECHNICAL FIELD

The present invention relates to a fluid handling device for liquid hydrogen, for handling of liquid hydrogen.

BACKGROUND ART

In recent years, as the problem of global warming has grown more serious, efforts are being made to expand the use of natural energy sources (renewable energy sources) such as sunlight, wind power, water power, and geothermal energy as energy sources to replace fossil fuels such as petroleum and natural gas. Such natural energy is at present being converted almost entirely into energy in electrical forms, but electricity is unsuited to storage in large amounts, and transport losses are also large. Hence in recent years the possibility is being studied of employing natural energy sources to produce and effectively use hydrogen, which can be stored in large amounts and transported over long distances, as hydrogen energy.

In addition to the merits of enabling storage and transport, hydrogen is present in inexhaustible amounts on the earth in the form of water and various compounds, and provides large amounts of power as energy used in rocket fuel and the like. Moreover, even when combusted, only water is generated upon reaction with oxygen in air, so that hydrogen is a clean energy source that does not entail emission of carbon dioxide or atmospheric pollutants, among other advantages.

Moreover, because there are quantitative limits to natural energy sources within Japan, the future possibilities of using natural energy sources within Japan to produce large quantities of hydrogen, and of storing and transporting same to resolve energy problems within Japan, are being studied.

Given this background, in conjunction with expansion of the use of hydrogen, establishment of technology to store and transport hydrogen is an urgent matter, and one matter related thereto is the development of a fluid handling device (loading arm) for handling liquid hydrogen that has been transported.

DISCLOSURE OF THE INVENTION

Problems to be Solved by the Invention

Hydrogen is a gas at normal temperature, and in a gaseous state the volume is large, which is unsuitable for storage and transport. Hence, in general, hydrogen is stored and transported in a liquefied state.

The boiling point of hydrogen is −253° C., and therefore the temperature must be lowered to −253° C. or lower for liquefaction. Moreover, because liquefied hydrogen evaporates extremely readily, during storage and transport of liquid hydrogen, it is essential that an environment at −253° C. or lower be maintained.

However, conventional fluid handling devices have poor heat insulation performance, and heat readily intrudes from outside and is conveyed to the fluid. Hence, there is the problem that when liquid hydrogen is circulated, heat due to the outside air temperature causes the temperature of the liquid hydrogen to rise, so that liquid hydrogen being circulated evaporates to enter the gaseous state, and efficient transport is no longer possible.

Further, by circulating liquid hydrogen at extremely low temperatures, the surface temperature of the piping becomes equal to that of the liquid hydrogen (−253° C.), so that oxygen present in the vicinity of the piping (boiling point: −183° C.) is liquefied and accumulates near the piping. Because oxygen is a combustion-supporting gas, there is the problem that, in the unlikely event of an accident in which a flame occurs, damage might be increased (safety would be reduced) due to the presence in the vicinity of liquefied oxygen, which as a gas is combustion-supporting.

The present invention has as an object the resolution of such problems by proposing an innovative and unprecedented fluid handing device for liquid hydrogen that has excellent heat insulation performance and enables efficient handling of liquid hydrogen being circulated, with evaporation reduced insofar as possible, and that moreover does not generate liquefied oxygen in the vicinity and affords excellent safety.

Means to Solve the Problems

The gist of the present invention shall now be described with reference to the accompanying drawings.

The present invention relates to a fluid handing device for liquid hydrogen, in which piping sections 1 that circulate liquid hydrogen are constituted from an inboard arm, an outboard arm, and elbow piping, and the various piping sections are rotatably connected by a swivel joint section 2, the fluid handing device for liquid hydrogen being characterized in that the piping sections 1 are formed having a vacuum-dual-pipe heat insulation structure, the swivel joint section 2 is constituted by connecting, to enable relative rotation, an outer ring section 3 that is connected with the one piping section 1 to be connected, and an inner ring section 4 that is connected with the other piping section 1, with a bearing section 5 interposed, and helium gas is sealed into a boundary relative-rotation section 6 between the outer ring section 3 and the inner ring section 4 in which the bearing section 5 is interposed, and a state is induced in which the pressure within said boundary relative-rotation section 6 is higher than atmospheric pressure; and between an outside-air-contacting wall section 7 that is exposed to the atmosphere and in contact with outside air and a liquid-hydrogen-contacting wall section 8 that is in contact with the liquid hydrogen being circulated there is provided a heat-conducting path extension section 10 that extends in the axial direction of a vacuum section 9 and that is provided with one end connected with the outside-air-contacting wall section 7 and the other end connected with the liquid-hydrogen-contacting wall section 8, the heat-conduction distance between the outside-air-contacting wall section 7 and the liquid-hydrogen-contacting wall section 8 is extended the outer ring section 3 is configured by providing a straight-pipe-shape fitted part 12 with a vacuum dual-pipe structure connected with an outer-ring-relative-rotation section 11 provided with the bearing section 5, and the inner ring section 4 is configured by providing a straight-pipe-shape fitting part 14 with a vacuum dual-pipe structure connected with an inner-ring-relative-rotation section 13 that engages with the outer-ring-relative-rotation section 11. The fitting section 14 is fitted with and engages the fitted section 12 to connect the outer ring section 3 and the inner ring section 4, and through the fitting engagement of the fitting section 14 and the fitted section 12, the vacuum sections 9 are formed in two layers between an outside pipe section 15 of the fitted section 12 that will become the outside-air-contacting wall section 7 and an inside pipe section 16 of the fitting section 14 that will become the liquid-hydrogen-contacting wall section 8, a pipe wall overlap section 19 is formed in which an inside pipe section 17 of the fitted section 12 and an outside pipe section 18 of the fitting section 14 overlap in a manner allowing relative rotation, and the pipe wall overlap section 19 becomes the heat-conducting path extension section 10 and extends the heat conduction distance between the outside pipe section 15 of the fitted section 12 that will become the outside-air-contacting wall section 7 and the inside pipe section 16 of the fitting section 14 that will become the liquid-hydrogen-contacting wall section 8, and the heat conductivity between the outside pipe section 15 of the fitted section 12 and the inside pipe section 16 of the fitting section 14 is reduced; the inside pipe section 16 and the outside pipe section 18 of the fitting section are mirror-finished; a stacked-layer vacuum heat insulation section 22 in which radiation shield sheets and spacers are stacked is provided between said inside pipe section 16 and the outside pipe section 18, heat conduction due to radiation between the outside air-contacting wall section 7 and the liquid hydrogen-contacting wall section 8 is reduced; and the heat conductivity between the outside-air-contacting wall section 7 and the liquid-hydrogen-contacting wall section 8 is reduced.

A second aspect of the present invention relates to the fluid handling device for liquid hydrogen according to the first aspect is further characterized in that in a connected state in which the fitted section 12 and the fitting section 14 are fitted and engaged, a state of communication obtains between a relative-rotation section 41 that will be a boundary section between the fitted section 12 and the fitting section 14, and the boundary relative-rotation section 6 with the bearing section 5 interposed; and helium gas is injected into the boundary relative-rotation section 6 and the helium gas is sealed into said boundary relative-rotation section 6 and the relative-rotation section 41, to induce a state in which the pressure within the boundary relative-rotation section 6 and within the relative-rotation section 41 is higher than atmospheric pressure.

A third aspect of the present invention relates to a fluid handling device for liquid hydrogen in which piping sections 1 that circulate liquid hydrogen are constituted by an inboard arm 1A, an outboard arm 1B, and elbow piping 1C, and the various piping sections 1 are rotatably connected by a swivel joint section 2 is further characterized in that: the piping sections 1 have a vacuum dual-pipe heat insulation structure; the swivel joint section 2 is configured by connecting, to enable relative rotation, an outer ring section 3 that is connected with one of the piping sections 1 to be connected and an inner ring section 4 that is connected with another of the piping sections 1, with a bearing section 5 interposed; helium gas is injected into a boundary relative-rotation section 6 between the outer ring section 3 and the inner ring section 4 with the bearing section 5 interposed, and a state is induced in which the pressure within said boundary relative-rotation section 6 is higher than atmospheric pressure; the outer ring section 3 is configured by providing a piping connection section 21 with a vacuum dual-pipe structure provided with a flange section 20, connected with an outer-ring-relative-rotation section 11 provided with the bearing section 5; the piping connection section 21 and the inner ring section 4 each constitute a vacuum dual-pipe structure, and the vacuum sections 9 are extended in the axial direction between the outside-air-contacting wall section 7 and the liquid-hydrogen-contacting wall section 8, and the heat-conducting path extension section 10 is provided forming a U-shape or a meandering shape, with one end connected with the outside-air-contacting wall section 7 and the other end connected with the liquid-hydrogen-contacting wall section 8; the heat conduction distance between the outside-air-contacting wall section 7 and the liquid-hydrogen-contacting wall section 8 is extended, the heat-conducting extended path section 10 is mirror-finished, a stacked-layer vacuum heat insulation section 22 in which radiation shield sheets and spacers are stacked is provided, heat conduction due to radiation between the outer air-contacting wall section 7 and the liquid hydrogen-contacting wall section 8 is reduced; and the heat conductivity between the outside-air-contacting wall section 7 and the liquid-hydrogen-contacting wall section 8 is reduced.

A seventh aspect of the present invention relates to the fluid handling device for liquid hydrogen according to any one of the first to sixth aspects is further characterized in that the heat insulation structure of the piping section 1 is a vacuum dual-pipe structure.

An eighth aspect of the present invention relates to the fluid handling device for liquid hydrogen according to the seventh aspect is further characterized in that a bayonet joint structure is used for interconnection of the piping sections 1.

Advantageous Result of the Invention

Since the present invention is configured as described above, heat insulation performance of the piping sections is improved and vacuum sections are provided between the outside-air-contacting wall section and the liquid-hydrogen-contacting wall section of the swivel joint section, and moreover a heat-conducting path extension section is provided that extends the heat conduction distance, so that the heat conduction distance between the outside-air-contacting wall section and the liquid-hydrogen-contacting wall section is made longer, heat conductivity between the outside-air-contacting wall section and the liquid-hydrogen-contacting wall section is reduced, and heat insulation performance is improved. Moreover, heat conduction due to radiation is reduced, and even higher heat insulation performance is exhibited. Hence an innovative fluid handling device for liquid hydrogen is obtained that affords excellent safety, in which heat inputted to the liquid-hydrogen-contacting wall section by outside air is reduced, evaporation of liquid hydrogen being circulated through the piping sections and the swivel joint section is reduced insofar as possible, and liquid hydrogen can be handled efficiently, which suppresses the occurrence of extremely low temperatures at the outside-air-contacting wall sections due to liquid hydrogen being circulated, and which does not generate liquefied oxygen in the vicinity.

BEST MODE FOR CARRYING OUT THE INVENTION

Preferred embodiments of the present invention are briefly described below with reference to the accompanying diagrams, while indicating the action of the present invention.

In the present invention, piping sections 1 with heat insulation structures are used, and therefore heat input to liquid hydrogen circulating within the piping sections 1 is reduced insofar as possible, and moreover the occurrence of extremely low temperatures at the surfaces of the piping sections 1 due to liquid hydrogen is prevented.

Further, in a swivel joint section 2 that rotatably connects the piping sections 1 in the present invention, a vacuum section 9 is provided between an outside-air-contacting wall section 7 and a liquid-hydrogen-contacting wall section 8 of the swivel joint section 2, and moreover a heat-conducting path extension section 10 is provided, with one end provided at the outside-air-contacting wall section 7 and the other end provided at the liquid-hydrogen-contacting wall section 8, so that the heat conduction distance from the outside-air-contacting wall section 7 to the liquid-hydrogen-contacting wall section 8 is made long, and therefore heat that has entered from the outside-air-contacting wall section 7 is not conducted directly toward the liquid-hydrogen-contacting wall section 8, but is conducted to the liquid-hydrogen-contacting wall section 8 in a roundabout way through the heat-conducting path extension section 10, so that heat conduction is reduced. Hence the heat conduction performance between the outside-air-contacting wall section 7 and the liquid-hydrogen-contacting wall section 8 in the swivel joint section 2 is reduced, heat input into the liquid hydrogen that passes through the swivel joint section 2 is reduced insofar as possible, and the occurrence of extremely low temperatures at the surface of the swivel joint section 2 due to liquid hydrogen is also prevented.

Therefore, an innovative and unprecedented fluid handling device for liquid hydrogen is obtained, in which temperature increases due to heat input into liquid hydrogen circulating through the piping sections 1 and the swivel joint section 2 are suppressed insofar as possible, evaporation of the liquid hydrogen is reduced insofar as possible, and fluid can be handled efficiently, and in which moreover the occurrence of extremely low temperatures (temperatures lower than the boiling point of oxygen) at the surfaces of the piping sections 1 and the swivel joint section 2 is prevented, so that liquefied oxygen is not generated in the vicinity and excellent safety is afforded.

Further, in the present invention, helium gas is sealed into the boundary relative-rotation section 6 between the outer ring section 3 and the inner ring section 4 in which the bearing section 5 is interposed, and therefore the sealed-in helium gas is not liquefied even when extremely low-temperature liquid hydrogen is circulated. Hence a fluid handling device for liquid hydrogen of high practical utility is obtained in which a pressurized state is maintained within the boundary relative-rotation section 6, the entrance of water and air from the outside is prevented, therefore malfunctions due to freezing of water or of moisture in air that has entered does not occur, and satisfactory rotation operation can be maintained.

Embodiment 1

A specific Embodiment 1 of the present application is described below, referring to FIG. 1 to FIG. 4.

As shown in the drawings, the present embodiment relates to a fluid handling device for liquid hydrogen in which various piping sections 1 such as an inboard arm 1A, an outboard arm 1B, and elbow piping sections 1C are rotatably connected by a swivel joint section 2, the device being provided with a balance weight mechanism 23 that balances according to the rotational orientation of the outboard arm 1B with respect to the inboard arm 1A. More specifically, a heat insulation structure is used in each piping section 1, and in the swivel joint section 2 an outer ring section 3 that is connected with one of the piping sections 1 for connection, and an inner ring section 4 that is connected with the other piping section 1, are connected to enable relative rotation with a bearing section 5 interposed. Moreover, helium is sealed into a boundary relative-rotation section 6 between the outer ring section 3 and the inner ring section 4 with the bearing section 5 interposed, and vacuum sections 9 extend in the axial direction between the outside-air-contacting wall section 7 that is exposed to the atmosphere and in contact with the outside air, and the liquid-hydrogen-contacting wall section 8 that is in contact with the liquid hydrogen that is being circulated. Moreover, a heat-conducting path extension section 10 is provided, with one end connected with the outside-air-contacting wall section 7 and the other end connected with the liquid-hydrogen-contacting wall section 8, so that the heat conduction distance between the outside-air-contacting wall section 7 and the liquid-hydrogen-contacting wall section 8 is extended, and heat conductivity between the outside-air-contacting wall section 7 and the liquid-hydrogen-contacting wall section 8 is reduced.

Below, each of the sections of the present embodiment is described in still greater detail.

Each of the piping sections 1 such as the inboard arm 1A, outboard arm 1B, and elbow piping sections 1C of the present embodiment employs a vacuum dual-pipe heat insulation structure as a heat insulation structure. That is, by providing vacuum sections 24, heat conduction is blocked and heat insulation performance is improved.

Further, in the present embodiment, the elbow piping sections 1C connected with the swivel joint section 2 are connected by welding, and interconnection of piping sections 1, and more specifically of the inboard arm 1A and the elbow piping section 1C, or of the outboard arm 1B and the elbow piping section 1C, are connected by a bayonet joint structure that fits and engages together vacuum dual piping to effect connection.

Figure 1:
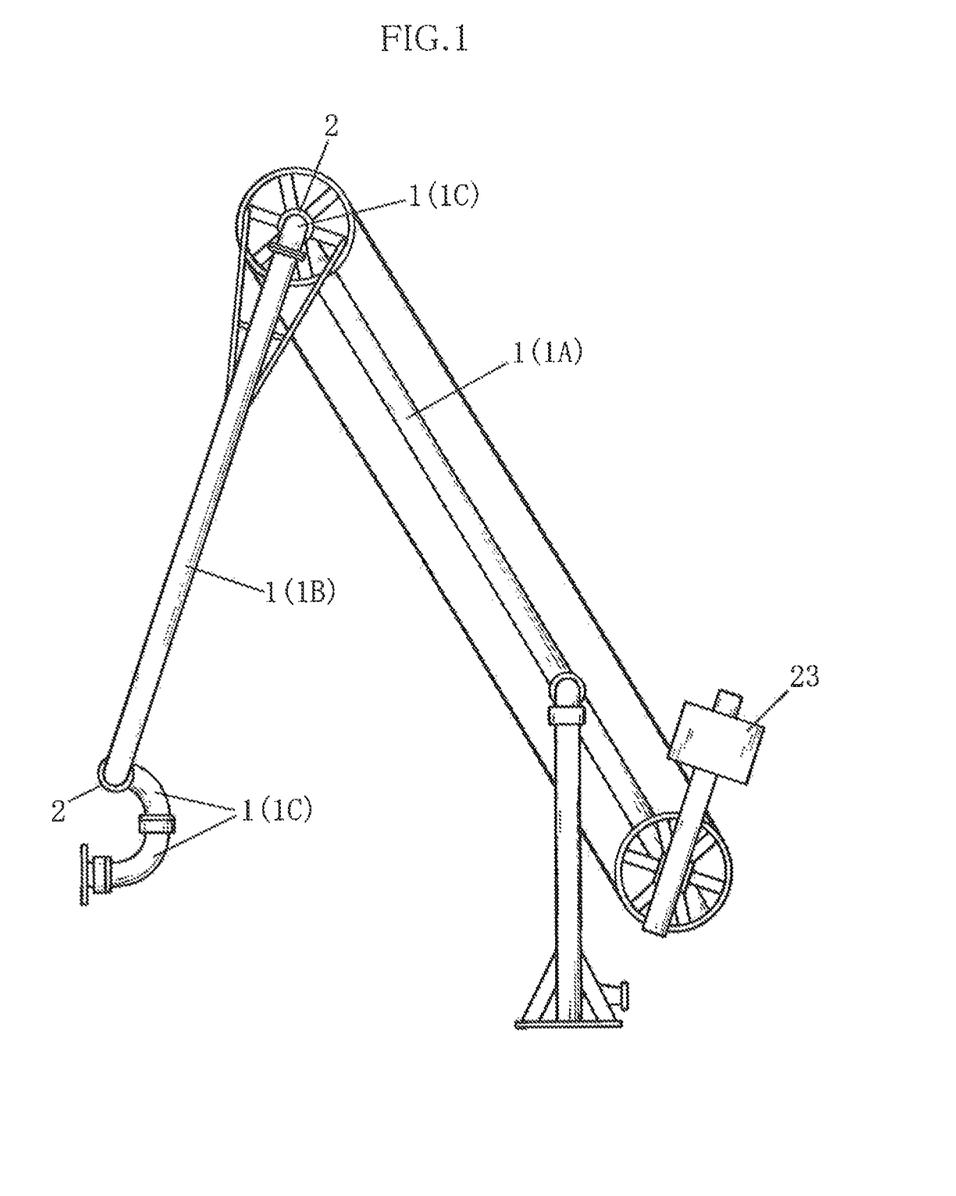
FIG. 1 is a summary diagram showing the fluid handling device of Embodiment 1.
Figure 2:
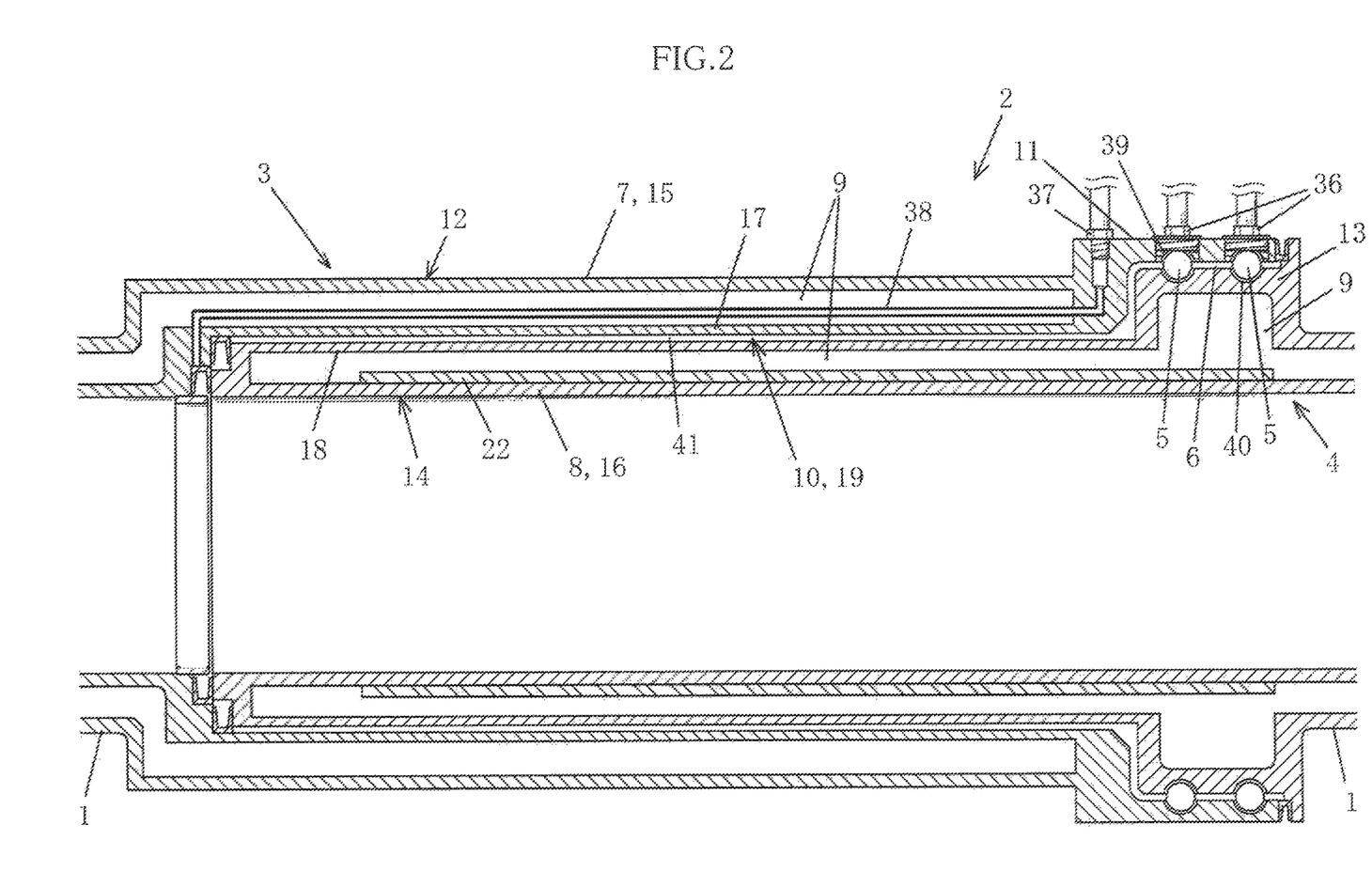
FIG. 2 is an explanatory front-view diagram showing the swivel joint section of Embodiment 1.
Figure 3:
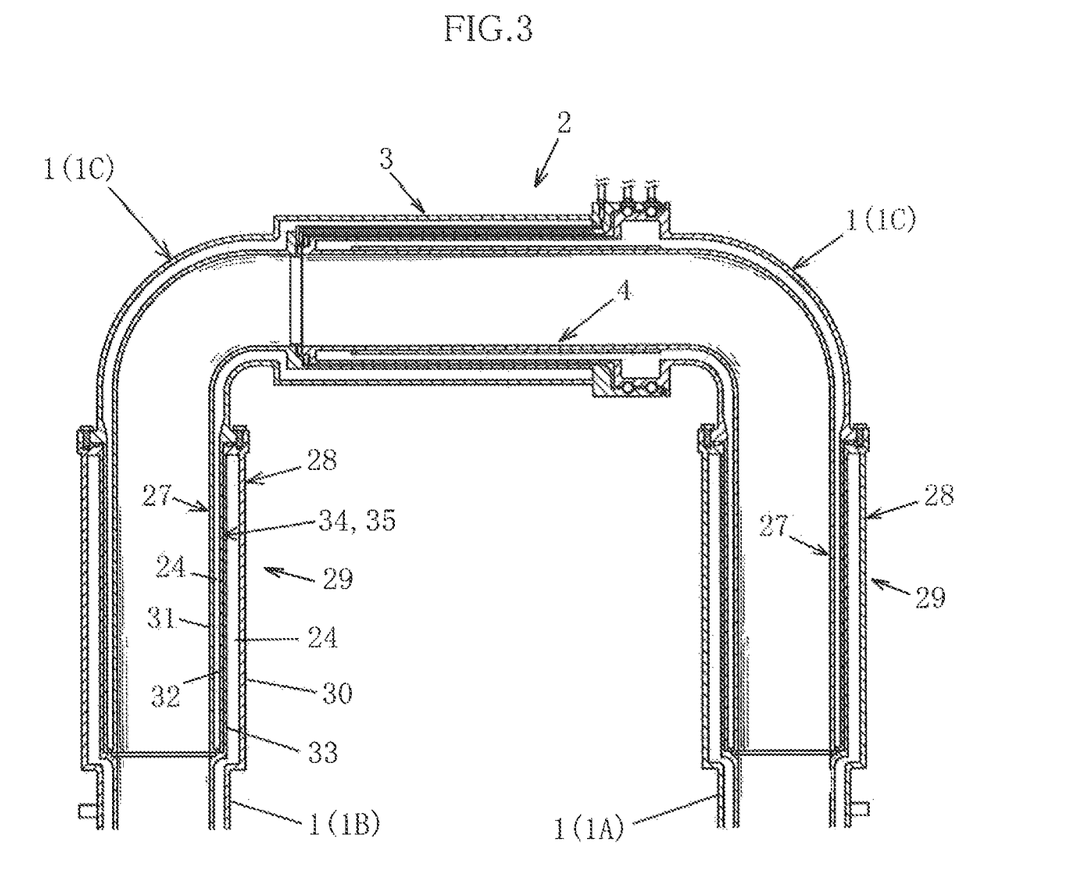
FIG. 3 is an explanatory front cross-sectional diagram showing the state of connection of piping sections and the swivel joint section of Embodiment 1.
Figure 4:
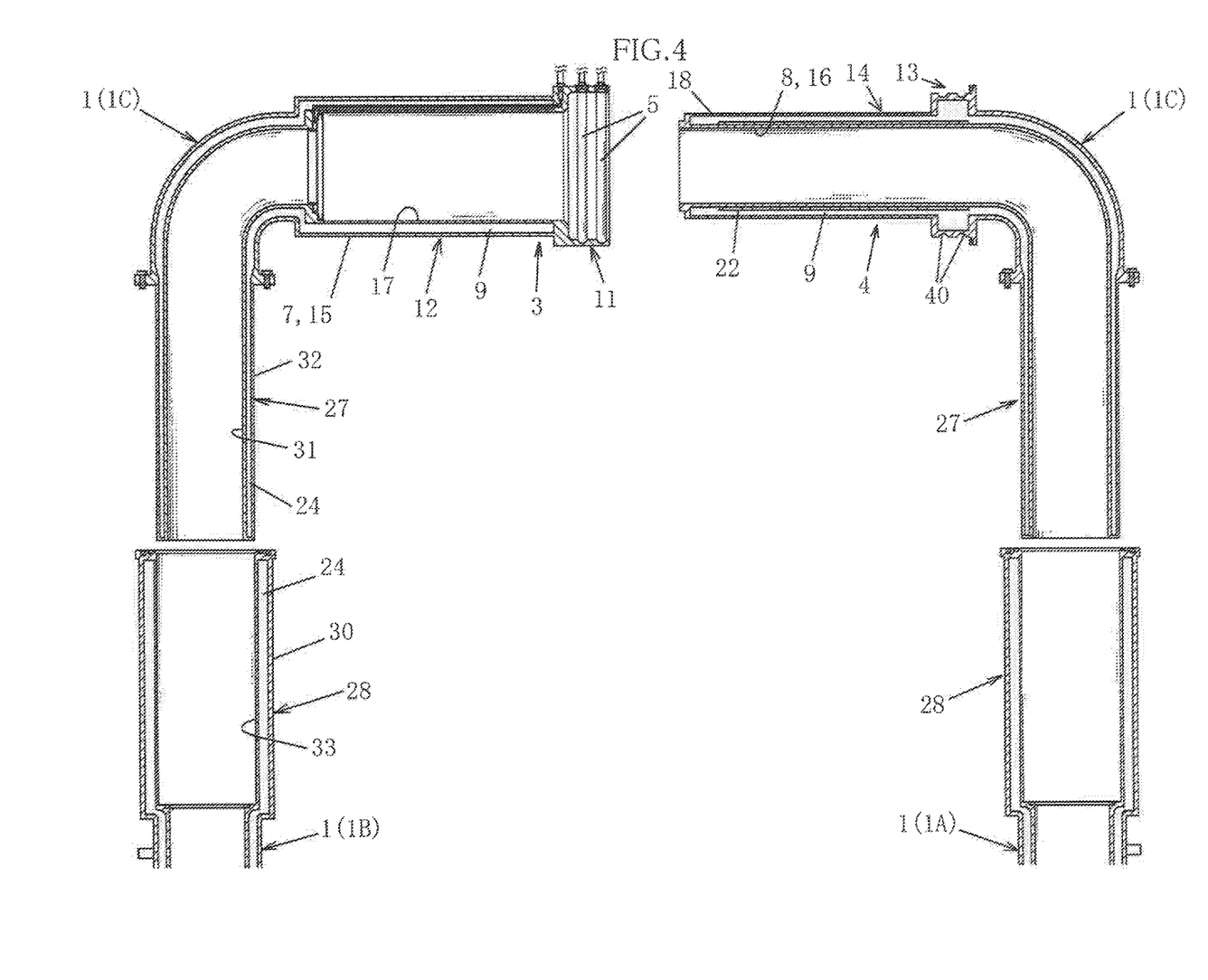
FIG. 4 is an exploded view of FIG. 3.

More specifically, as illustrated, an extension fitting pipe section 27 with a vacuum dual-pipe structure is provided in extension on the tip side of an elbow piping section 1C, and on the tip side of the inboard arm 1A (or outboard arm 1B) connected to the elbow piping section 1C is provided in extension an extension fitted pipe section 28 with a vacuum dual-pipe structure; the extension fitting pipe section 27 of the elbow piping section 1C is fitted and engaged with the extension fitted pipe section 28, and the respective flange connection sections are abutted and connected by tightening bolts.

Further, in the extension pipe overlap section 29 in which the extension fitting pipe section 27 and the extension fitted pipe section 28 overlap, vacuum sections 24 are formed in dual layers between the outside pipe section 30 of the extension fitted pipe section 28 that is in contact with the outside air, and the inside pipe section 31 of the extension fitting pipe section 27 that is in contact with the liquid hydrogen, and moreover, between the dual-layer vacuum sections 24 is formed an inner pipe-outer pipe overlapping section 34, in which the outside pipe section 32 of the extension fitting pipe section 27 and the inside pipe section 33 of the extension fitted pipe section 28 overlap, in a manner allowing relative rotation. The inner pipe-outer pipe overlapping section 34 becomes a heat-conducting path extension section 35 that extends the heat condition distance for heat condition occurring between the outside pipe section 30 of the extension fitted pipe section 28 and the inside pipe section 31 of the extension fitting pipe section 27, and heat that has entered from the outside pipe section 30 of the extension fitted pipe section 28 is not conducted directly to the inside pipe section 31 of the extension fitting pipe section 27, but is conducted to the inside pipe section 31 of the extension fitting pipe section 27 in a roundabout way through the heat-conducting path extension section 35, so that heat conduction is reduced and heat conductivity is reduced. Hence the heat insulation performance of the extension pipe overlap section 29 formed by fitting and engaging the extension fitting pipe section 27 and the extension fitted pipe section 28 is improved.

Further, the outer ring section 3 constituting the swivel joint section 2 is configured by providing a straight-pipe-shape fitted part 12 with a vacuum dual-pipe structure, provided with a vacuum section 9, connected with an outer-ring-relative-rotation section 11 provided with the bearing section 5.

More specifically, the outer ring section 3 of the present embodiment is configured by providing a purge port section 36 and a leakage gas recovery port section 37 in the outer-ring-relative-rotation section 11, and providing the fitted section to be connected on the base-end side, and providing the piping section 1 (elbow piping section 1C) connected with the fitted section 12.

Still more specifically, the length of the fitted section is set to be sufficiently longer than the distance (thickness) between the outside pipe section 15 of the fitted section 12 that will become the outside-air-contacting wall section 7 when the fitted section 12 and a fitting section 14, described below, are fitted and engaged, and the inside wall section 16 of the fitting section 14 that will become the liquid-hydrogen-contacting wall section 8 (in the present embodiment, for a thickness of approximately 60 mm, the length is approximately 500 mm).

Further, the purge port section 36 provided in the outer-ring-relative-rotation section 11 communicates with the bearing installation section 39 in which the bearing section 5 is installed, helium gas is injected as a purge gas from the purge port section 36, and via the bearing section 5 that is formed in a state in which a swivel joint section 2 is formed in which the outer ring section 3 and the inner ring section 4 are connected, helium gas within the boundary relative-rotation section 6 that performs relative rotation is replaced, and moreover the interior of the boundary relative-rotation section 6 is put into a state of higher pressure than atmospheric pressure, so that entry of water and air from outside is prevented. In other words, the present embodiment is configured such that the pressure within the boundary relative-rotation section 6 is increased to generate a positive pressure with respect to the outside so that entry of water and air from the outside is prevented, the occurrence of malfunctions in the boundary relative-rotation section 6 due to freezing of such water and the moisture in air is prevented, and moreover by using helium gas as a purge gas, even if a low temperature occurs within the boundary relative-rotation section 6 due to liquid hydrogen, the helium gas has a lower melting point than the liquid hydrogen temperature and so does not freeze, and smooth operation of the boundary relative-rotation section 6 is maintained.

Further, the leakage gas recovery port section 37 is for discharging leakage gas that has leaked from the connection section (abutting section) of the outer ring section 3 and the inner ring section 4 to the outside for recovery. In the present embodiment, a leakage gas recovery piping section 38 is disposed within the vacuum section 9 provided within the fitted section between the outside pipe section 15 and the inside pipe section 17; leakage gas passes through this leakage gas recovery piping section 38, is discharged from the leakage gas recovery port section 37, and is recovered.

Further, in the present embodiment, the surface on the atmosphere side of the inside pipe section 17 of the fitted section 12 is given a mirror finish, to reduce heat conduction due to radiation (to reduce heat conduction by reflection of radiant heat due to radiation).

Further, the inner ring section 4 in the present embodiment is configured by providing a straight pipe-shape fitting part 14 with a vacuum dual-pipe structure provided with a vacuum section 9, connected with an inner-ring-relative-rotation section 13 that engages with the outer-ring-relative-rotation section 11 of the above-described outer ring section 3.

Specifically, the inner-ring-relative-rotation section 13 is provided with a bearing receiver 40 that engages with a bearing installation section 39 provided in the outer-ring-relative-rotation section 11, and moreover constitutes a vacuum dual-pipe structure, with the fitting section 14 connected with the tip side and a piping section 1 (elbow piping section 1C) provided by welding to be connected with the base side.

Further, similarly to the above-described fitted section 12, the length of the fitting section 14 is set to be sufficiently longer than the distance (thickness) between the outside pipe section 15 of the fitted section 12 that will become the outside-air-contacting wall section 7, and the inside pipe section 16 of the fitting section 14 that will become the liquid-hydrogen-contacting wall section 8 (in the present embodiment, the length is substantially equal to that of the fitted section 12).

In the present embodiment, the surfaces on the atmosphere side of both the inside pipe section 16 and the outside pipe section 18 of the fitting section 14 are given a mirror finish, to reduce heat conduction due to radiation.

In addition, the inner ring section 4 of the present embodiment is provided, between the inside pipe section 16 and the outside pipe section 18, and more specifically on the surface on the atmosphere side of pipe walls in contact with liquid hydrogen (the inside pipe section 16 of the fitting section 14 and the inside wall section of the inner-ring-relative-rotation section 13), with a stacked-layer vacuum heat insulation section 22, formed by providing in alternation spacers and radiation shield sheets such as aluminum vacuum-evaporated film in parallel in an stacked-layer state, and due to the stacked-layer vacuum heat insulation section 22, heat conduction due to radiation is further reduced.

In the swivel joint section 2 of the present embodiment, the above-described fitting section 14 is fitted with and engages the fitted section 12 and the outer ring section 3 and inner ring section 4 are connected, and moreover by fitting and engaging the fitting section 14 and the fitted section 12, the vacuum section 9 is formed in dual layers between the outside pipe section 15 of the fitted section 12 that will become the outside-air-contacting wall section 7 and the inside pipe section 16 of the fitting section 14 that will become the liquid-hydrogen-contacting wall section 8 of the swivel joint section 2. Moreover, a pipe wall overlap section 19 is formed in which an inside pipe section 17 of the fitted section 12 and an outside pipe section 18 of the fitting section 14 overlap in a manner allowing relative rotation between the outside pipe section 15 and the inside pipe section 16, the pipe wall overlap section 19 becomes a heat-conducting path extension section 10, the heat conduction distance is extended between the outside pipe section 15 of the fitted section 12 that will become the outside-air-contacting wall section 7 and the inside pipe section 16 of the fitting section 14 that will become the liquid-hydrogen-contacting wall section 8, reducing heat conduction. Further, the surfaces on the atmosphere side of the inside pipe section 17 of the fitted section 12 and of the inside pipe section 16 and outside pipe section 18 of the fitting section 14 are mirror-finished, and a stacked-layer vacuum heat insulation section 22 is provided on the atmosphere-side surface (within the vacuum section 9) of the inside pipe section 16 of the fitting section 14 to reduce heat conduction due to radiation, in a configuration in which heat conductivity is reduced between the outside pipe section 15 of the fitted section 12 that will become the outside-air-contacting wall section 7 and the inside pipe section 16 of the fitting section 14 that will become the liquid-hydrogen-contacting wall section 8.

In the swivel joint section 2 of the present embodiment, in a connection state in which the fitted section 12 and the fitting section 14 are fitted and engaged, the relative-rotation section 41 that will become the boundary section of the fitted section 12 and the fitting section 14 is in a state of communication with the boundary relative-rotation section 6 with the bearing section 5 interposed, helium gas injected into the boundary relative-rotation section 6 is also injected into the relative-rotation section 41, and in the relative-rotation section 41 also, similarly to the boundary relative-rotation section 6, entry of outside air and moisture from the outside due to a rise in the internal pressure is prevented, and the occurrence of malfunctions due to freezing of moisture that has entered is prevented. Moreover, even if low temperatures occur in the relative-rotation section 41 due to the liquid hydrogen, the helium gas does not freeze, and smooth rotation operation of the relative-rotation section 41 is maintained.

Thus in the present embodiment, conduction to the liquid-hydrogen-contacting wall section 8 of heat that has entered from the outside-air-contacting wall section 7 is reduced insofar as possible, and the heat insulation performance of the piping sections 1 and the swivel joint section 2 is improved, so that increases in temperature caused by heat input to liquid hydrogen that is circulated within the piping sections 1 and within the swivel joint section 2 is suppressed insofar as possible, and evaporation of the liquid hydrogen is reduced insofar as possible, so that efficient fluid handling is possible. Moreover, the occurrence of extremely low temperatures (temperatures lower than the boiling point of oxygen) at the surfaces of the piping sections 1 and swivel joint section 2 is prevented, resulting in an innovative fluid handling device for liquid hydrogen that does not generate liquefied oxygen in the vicinity and affords excellent safety.

Moreover, by injecting and sealing helium gas into the boundary relative-rotation section 6 with the bearing section 5 interposed and into the relative-rotation section 41 at which there is relative rotation of the fitted section 12 and the fitting section 14, even when liquid hydrogen at extremely low temperatures is circulated, helium gas sealed into the relative-rotation section 41 is not liquefied, so that a pressurized state is maintained within the boundary relative-rotation section 6, and entry of water and air from outside into the boundary relative-rotation section 6 and the relative-rotation section 41 is prevented. Hence a fluid handling device for liquid hydrogen of high practical utility is obtained in which malfunctions due to freezing of water and of moisture in air that has entered do not occur, and satisfactory rotation operation can be maintained.

Embodiment 2

Figure 5:
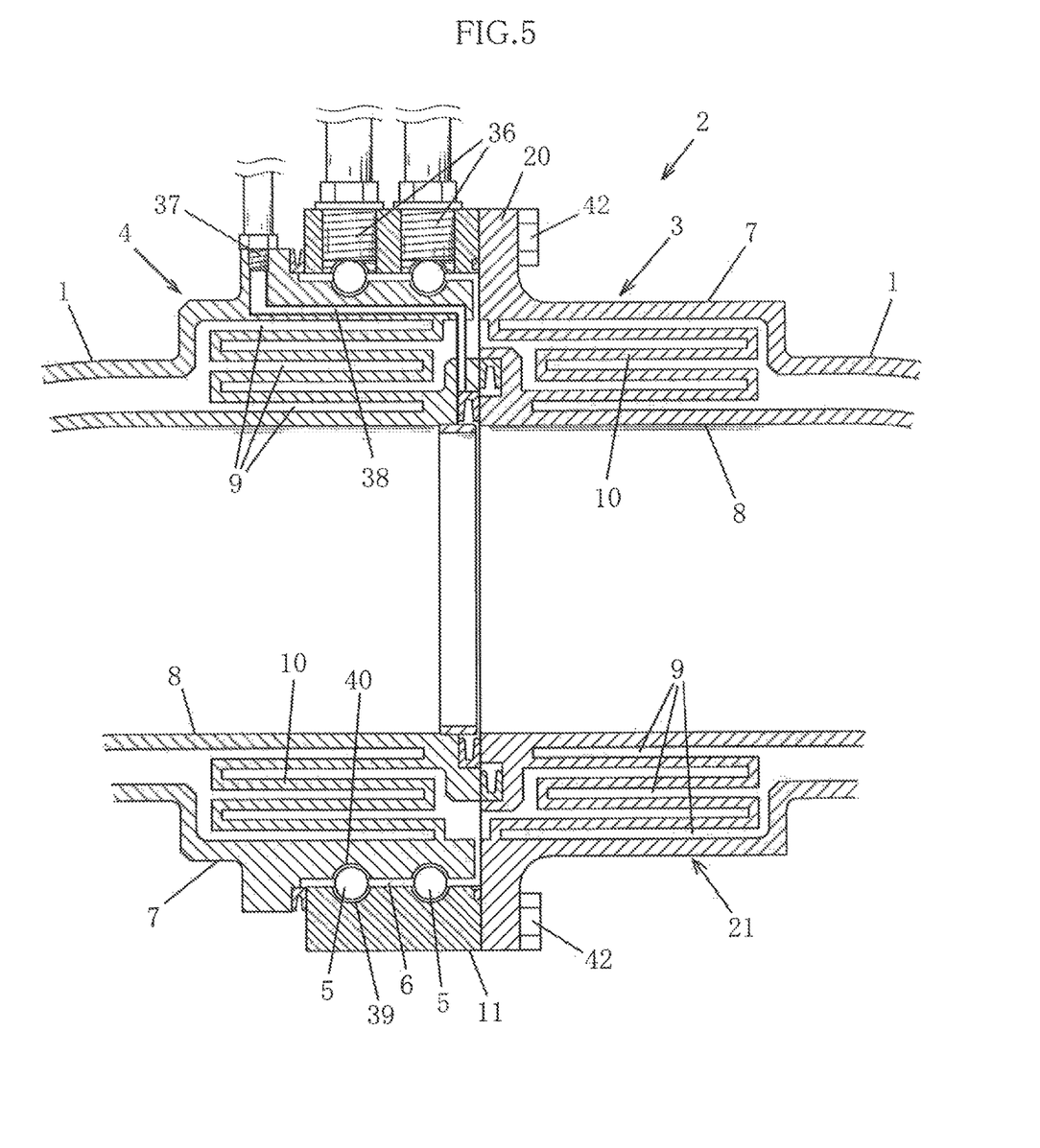
FIG. 5 is an explanatory front-view cross-sectional diagram showing the swivel joint section of Embodiment 2.

A specific Embodiment 2 of the present application is described below, referring to FIG. 5.

The present embodiment is a case in which the swivel joint section 2 in Embodiment 1 is configured differently.

In the outer ring section 3 of the present embodiment, a piping connection section 21 with a vacuum dual-pipe structure is connected with a flange section 20 of the outer-ring-relative-rotation section 11 which is provided with the bearing section 5.

More specifically, in the outer ring section 3 of the present embodiment, a piping connection section 21 is connected to the base-end section end face of the outer-ring-relative-rotation section 11 by overlapping and connecting with bolts 42 the flange section 20 provided in the tip-end section of the piping connection section 21. The outer-ring-relative-rotation section 11 is provided with a bearing installation section 39 and with a purge port section 36 that communicates with the bearing installation section 39. The piping section 1 (elbow piping section 1C) is connected by welding to the piping connection section 21.

Further, in the piping connection section 21, a heat-conducting path extension section 10 is provided with a vacuum dual-pipe structure between the outside-air-contacting wall section 7 and the liquid-hydrogen-contacting wall section 8, with one end connected to the outside-air-contacting wall section 7 and the other end connected to the liquid-hydrogen-contacting wall section 8 forming a U-shape or a meandering shape, to extend the heat conduction distance between the outside-air-contacting wall section 7 and the liquid-hydrogen-contacting wall section 8. Moreover, the heat-conducting path extension section 10 constitutes a closing section that closes an opening section (the opening section that communicates with the inner ring section 4) of the piping connection section 21, with vacuum induced on the side of the base-end section (the side of the piping 1 in the drawing) from the heat-conducting path extension section 10, with the heat-conducting path extension section 10 surrounded by a vacuum section 9, so that direct heat conduction from the outside-air-contacting wall section 7 to the liquid-hydrogen-contacting wall section 8 is blocked, and heat conductivity between the outside-air-contacting wall section 7 and the liquid-hydrogen-contacting wall section 8 is reduced.

The purge port section 36 provided in the outer-ring-relative-rotation section 11 of the present embodiment is provided with an objective similar to that of Embodiment 1, and the action and effect are similar to those in Embodiment 1.

Further, the inner ring section 4 is provided with a bearing receiver section 40 that engages with the bearing installation section 39 provided in the outer-ring-relative-rotation section 11 of the above-described outer ring section 3, and with a leakage gas recovery port section 37 and leakage gas recovery piping section 38 for discharge to the outside and recovery of leakage gas that leaks from the connection section (abutting section) of the outer ring section 3 and the inner ring section 4.

Further, similarly to the piping connection section 21 of the outer ring section 3, in the inner ring section 4 a heat-conducting path extension section 10 is provided between the outside-air-contacting wall section 7 and the liquid-hydrogen-contacting wall section 8, with one end connected to the outside-air-contacting wall section 7 and the other end connected to the liquid-hydrogen-contacting wall section 8 forming a U-shape or a meandering shape, to extend the heat conduction distance between the outside-air-contacting wall section 7 and the liquid-hydrogen-contacting wall section 8. Moreover, the heat-conducting path extension section 10 constitutes a closing section that closes an opening section (the opening section that communicates with the outer ring section 3) of the inner ring section 4, with vacuum induced on the side of the base-end section (the side of the piping 1 in the drawing) from the heat-conducting path extension section 10, with the heat-conducting path extension section 10 surrounded by the vacuum section 9, so that direct heat conduction from the outside-air-contacting wall section 7 to the liquid-hydrogen-contacting wall section 8 is blocked, and heat conductivity between the outside-air-contacting wall section 7 and the liquid-hydrogen-contacting wall section 8 is reduced.

Further, in the heat-conducting path extension sections 10 of both the outer ring section 3 and the inner ring section 4, similarly to Embodiment 1, the surfaces on the atmosphere side are mirror-finished, to reduce heat conduction due to radiation.

Although not illustrated, it is preferable that a stacked-layer vacuum heat insulation section 22 similar to that of Embodiment 1 be provided. By providing a stacked-layer vacuum heat insulation section 22, further improvement of heat insulation performance can be expected.

The swivel joint section 2 of the present embodiment is configured with the inner ring section 4 and the outer-ring-relative-rotation section 11, configured as described above, connected to enable relative rotation with the bearing section 5 interposed, with the piping connection section 21 abutting and connected the inner ring section 4 and the flange section 20 overlapping with the outer-ring-relative-rotation section 11 and fastened by tightening bolts 42, to connect the outer ring section 3 and the inner ring section 4.

Otherwise the configuration is similar to that of Embodiment 1.

The present invention is not limited to Embodiments 1 and 2, and the specific configurations of each of the constituent elements can be designed appropriately.

The invention claimed is:

1. A fluid handling device for liquid hydrogen, comprising:
a swivel joint section rotatably connected to piping sections including an inboard arm, an outboard arm, and elbow piping, the piping sections having a vacuum dual pipe structure;
wherein the swivel joint section further comprises:
an outer ring that is connected with one of the piping sections, the outer ring being exposed to an ambient atmosphere,
an inner ring that is connected with another of the piping sections, the outer ring and the inner ring being engaged with and rotatable with respect to each other, the inner ring having an interior passage being configured to be in contact with and permit a flow of the liquid hydrogen,
a bearing disposed between the outer ring and the inner ring,
a boundary relative-rotation section storing helium gas that is disposed between the outer ring and the inner ring, wherein a state is induced in which a local pressure within said boundary relative-rotation section is higher than a pressure of the ambient atmosphere, and
a purge port disposed on the outer ring that is configured to permit the helium gas to be injected into the boundary relative-rotation section from outside of the fluid handling device,
wherein the outer ring comprises a first outer section and a first inner section, with a first vacuum section disposed between the first outer section and the first inner section,
wherein the inner ring comprises a second outer section and a second inner section, with a second vacuum section disposed between the second outer section and the second inner section,
wherein the boundary relative-rotation section is disposed between the first inner section and the second outer section,
wherein the second outer section and the second inner section of the inner ring are mirror-finished, and
wherein a stacked-layer vacuum heat insulation section in which radiation shield sheets and spacers are stacked is provided between the second outer section and the second inner section of the inner ring.

2. The fluid handling device for liquid hydrogen according to claim 1, wherein
at least one of the outer ring or the inner ring includes a heat-conducting path that has a U-shape or a zig-zag shape, with one end connected with an outside air contacting wall section and the other end connected with a liquid hydrogen contacting wall section.

3. The fluid handling device for liquid hydrogen according to claim 1, wherein
the outer ring and the inner ring each include a heat-conducting path that has a U-shape or a zig-zag shape, with one end connected with an outside air contacting wall section and the other end connected with a liquid hydrogen contacting wall section.

4. The fluid handling device for liquid hydrogen according to claim 1, wherein a bayonet joint structure is used for interconnection of the piping sections.

5. The fluid handling device for liquid hydrogen according to claim 2, wherein a bayonet joint structure is used for interconnection of the piping sections.

* * * * *

UNITED STATES PATENT AND TRADEMARK OFFICE
CERTIFICATE OF CORRECTION

PATENT NO. : 10,591,105 B2  
APPLICATION NO. : 15/738452  
DATED : March 17, 2020  
INVENTOR(S) : Takami et al.

Page 1 of 1

It is certified that error appears in the above-identified patent and that said Letters Patent is hereby corrected as shown below:

In the Specification

Column 2, Line 44, delete "and"

Column 4, Lines 23 to 27 delete whole the second paragraph

Column 4, Line 28, delete "An eighth" and insert --A fourth-- therefor

Column 4, Lines 29 to 30, delete "the seventh aspect" and insert --any of the first through third aspects-- therefor Column 7, Lines 38 and 41, after "fitted section" insert numeral --12--

Column 8, Line 15, after "fitted section" insert numeral --12--

Signed and Sealed this  
Eighth Day of September, 2020

Andrei Iancu  
*Director of the United States Patent and Trademark Office*